Patented May 19, 1931

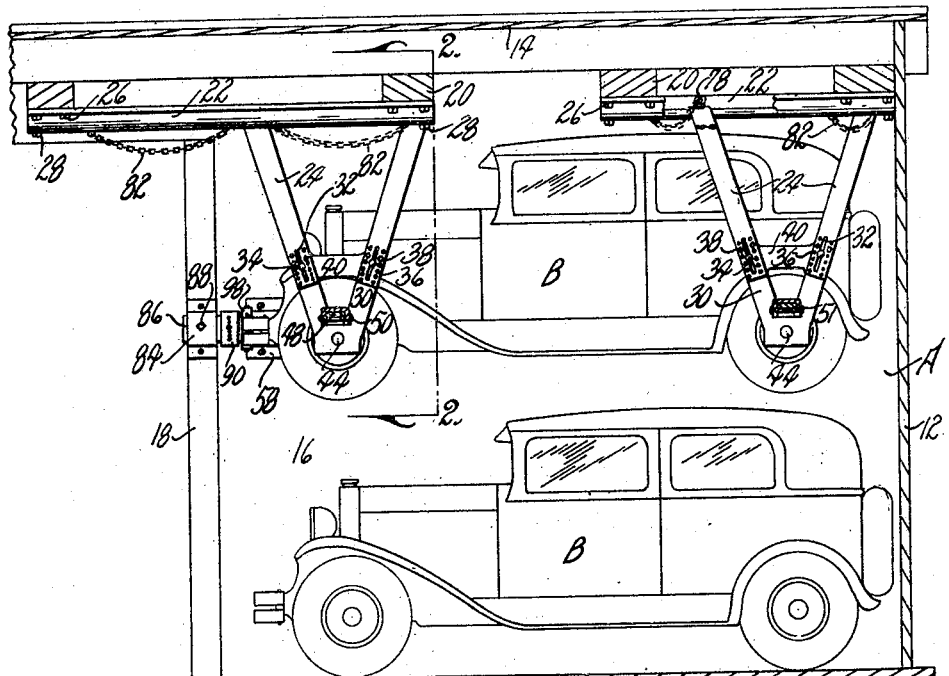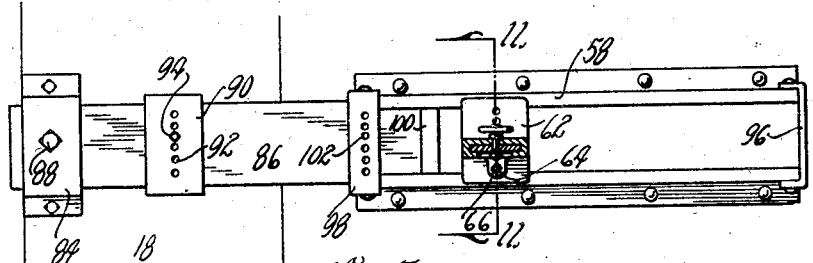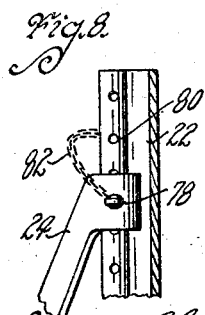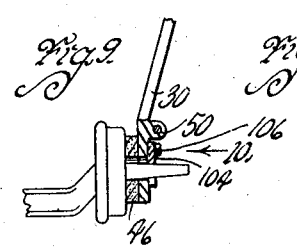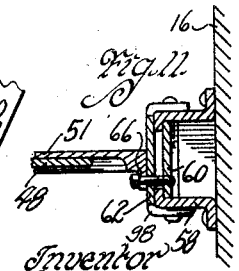

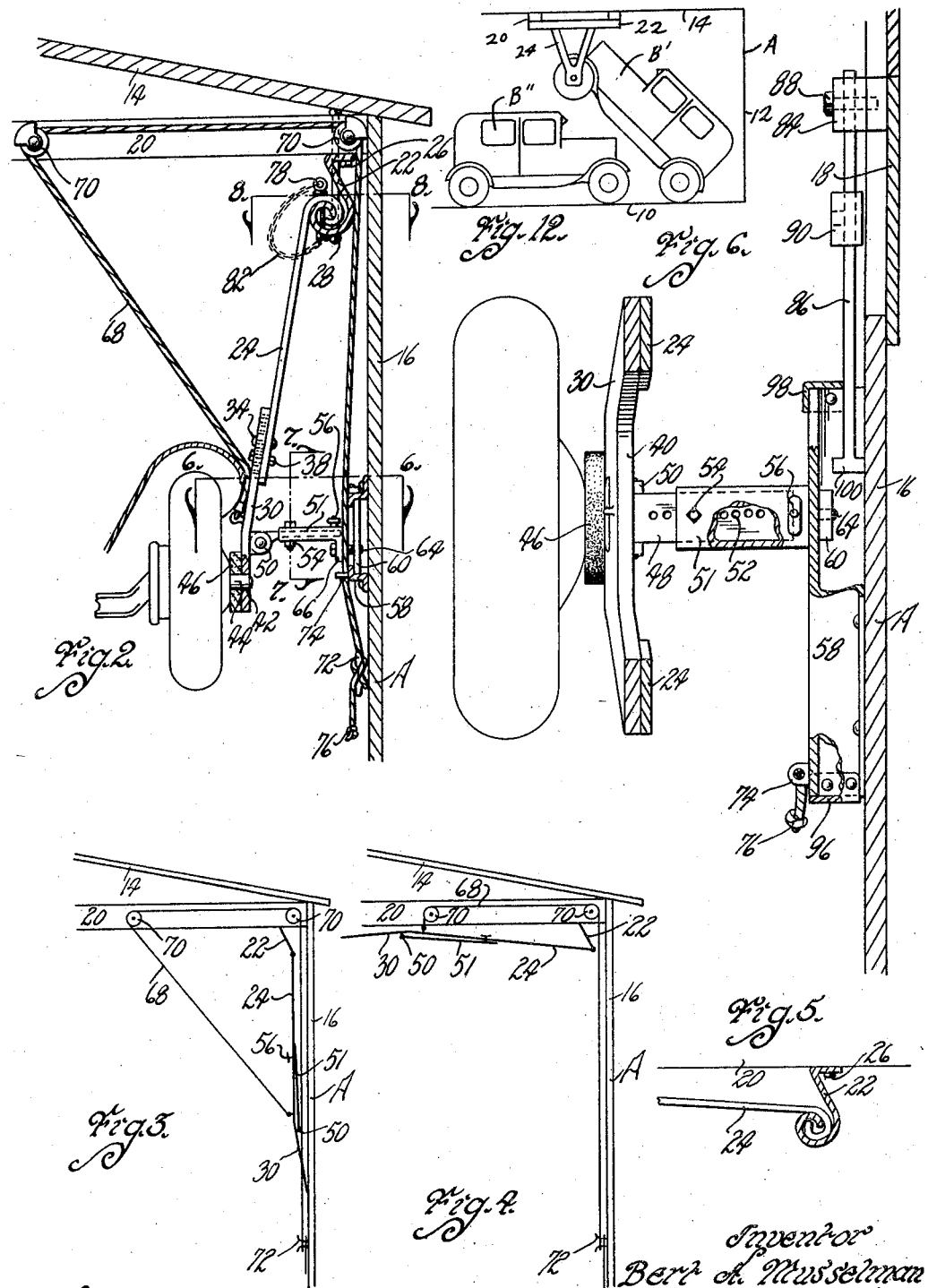

1,805,881

UNITED STATES PATENT OFFICE

BERT A. MUSSELMAN, OF DES MOINES, IOWA

OVERHEAD AUTOMOBILE DECKING FOR RAILWAY CARS

Application filed September 8, 1930. Serial No. 480,468.

An object of my invention is to provide permanent overhead automobile decking for railway cars of simple, durable and inexpensive construction.

A further object is to provide a means for suspending automobiles adjacent the roof of a railway car whereby other automobiles may be stored therebeneath, the suspension means being readily and easily operable and being arranged for swinging movement to an out of the way position either against the side of the railway car when removing the upper automobiles or to a position against the roof of the car when removing the lower automobiles or when using the railway car for other commodities.

More particularly, it is my object to provide overhead decking consisting of suspension means for automobiles, the suspension means comprising suspension members, one for each wheel of the automobile and thrust members for preventing lateral movement of the suspension members, the suspension members being mounted on, and longitudinally movable relative to, track members, the various parts of the device being adjustable in various ways for the purpose of adapting it to all sizes of automobiles.

A further object is to provide a means for hinging the suspension members relative to the track members whereby the suspension members can be raised to an out of the way position when it is desirable to use the railway cars for commodities other than automobiles without the necessity of having to remove any of the parts, as in some types of decking which must be built into the car and then torn out of it after the automobiles have been shipped.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a longitudinal vertical sectional view of a railway car illustrating two automobiles therein, one above the other and showing an embodiment of my overhead decking for suspending the upper automobile.

Figure 2 is a vertical sectional view on the line 2—2 of Figure 1 showing an end elevation of one of the suspending means.

Figure 3 is a diagrammatic view showing the suspending means in a different position, to wit:—out of the way adjacent the side of the railway car.

Figure 4 is a similar diagrammatic view showing the suspending means in a different position, to wit:—adjacent the roof of the railway car.

Figure 5 is a sectional view similar to a portion of Figure 2 illustrating the coaction between the track members and a suspension member, the suspension member being shown in the position illustrated in Figure 4.

Figure 6 is a sectional view on the line 6—6 of Figure 2 showing a plan view of a thrust member.

Figure 7 is a sectional view on the line 7—7 of Figure 2 showing a front elevation of a wall and door bracket to which the thrust member is secured.

Figure 8 is a sectional view on the line 8—8 of Figure 2 showing a plan view of a portion of a track member and the suspension member coacting therewith.

Figure 9 is a sectional view similar to a portion of Figure 2 showing a different manner of suspending the automobile.

Figure 10 is an elevation of Figure 9 taken in the direction of the arrow 9.

Figure 11 is a sectional view on the line 11—11 of Figure 7 illustrating clamping members and their coaction with the thrust member and wall bracket; and Figure 12 is a diagrammatical view showing an automobile "half decked."

On the accompanying drawings, I have used the reference character A to indicate generally a railway car and the character B to indicate generally automobiles. The railway car A includes a floor 10, end walls 12, roof 14, side walls 16 and door 18. A railway car is usually provided with cross beams 20 under the roof 14 and in general practice hoists are connected to these cross beams for the purpose of lifting the automobiles B so that they can be decked for transportation.

My overhead decking consists essentially of a suspending means for the upper automobile B illustrated in Figure 1 and includes track members 22 and suspension arms 24. The upper ends of the suspension arms 24 are of curled construction as best shown in Figures 2 and 5 of the drawings and interfit with the tracks 22, the lower edges of which are also of curled construction. The curled arrangements of the tracks and suspension arms are such as to allow swinging or pivotal movement of the suspension arms 24 relative to the track members 22 but prevent disengagement of the arms 24 relative to the tracks 22. The tracks 22 are supported on the beams 20 by means of lag screws or bolts 26 and bolts 28. The bolts 28 are located at the ends of the track members 22 and serve to prevent disengagement of the suspension arms 24 from the track members during the sliding movement of the suspension arms relative to the track members.

V-shaped suspension members 30 are adjustably connected with the suspension arms 24 by means of slot and rivet connections 32 and 34 and spaced opening and bolt connections 36 and 38. The slot and rivet connections prevent removal of the suspension members 30 from the suspension arms 24 yet allow adjustments as to length of the suspension means. A cross bar 40 is provided to strengthen the suspension members 30.

The suspension members 30 are provided with openings 42 adapted to receive tubular extension hub nuts 44 which are screwed onto the axles of the automobiles B in place of the regulation hub nut thereon. Rubber pads 46 are secured to the sides of the suspension members 30 around the openings 42 to prevent marring the wheels of the automobile.

Thrust members are provided for keeping the pads 46 against the wheels of the automobile and preventing lateral movement of the upper decked automobile B with respect to the railway car A. These thrust members comprise arms 48 hinged as indicated at 50 to the suspension members 30 with extension members 51 slidable relative to them and a spaced opening and bolt means 52 and 54 being provided for retaining the members 48 and 51 in adjusted positions relative to each other. The members 51 are provided with buttons 56 adapted to engage with the cross bar 40 when it is desirable to fold the members 48 and 51 against the suspension member 30, thus out of the way as illustrated in Figures 3 and 4.

The members 51 are adapted to be connected with the side walls 16 of the railway car A and for this purpose I provide bracket members 58 and clamp bars 60 and 62. A bolt 64 extends through a foot 66 on the member 51 and through the clamp bar 62 and is screw threaded into the clamp bar 60. This bolt clamps the clamp bars in any position longitudinally on the bracket members 58 and secures the thrust members 48—51 to the clamp bars and consequently to the side 16 of the car A.

A rope 68, pulleys 70 and a holding bracket 72 are provided whereby the suspension means 24—30 may be raised to an out of the way position as shown in Figure 4. An ear 74 on one of the bracket members 58 serves as a guide for the rope 68 and by means of a knot 76 the rope is prevented from assuming an out of reach position.

Practical operation

In the operation of the device, the suspension means are adjusted to the necessary positions with respect to the track members 22 and are thereafter retained in such positions by means of pins 78 which may coact with any one of a series of openings 80 (see Figure 8). Chains 82 prevent losing the pins 78 when they are not in inserted position. The bolts 38 are placed in the proper openings 36 for supporting the automobile at the desired height. The automobile is then hoisted into position (the members 44 having been previously substituted for the axle nuts).

When the automobile is hoisted to the proper position the suspension members 30 are swung away from the sides of the car A until the openings 42 coact with the members 44. The thrust members 48 and 51 are then adjusted relative to each other for retaining the cushioning pads 46 against the wheels of the automobile. The feet 66 on the members 51 are then secured to the clamp bars 60 and 62, the plurality of openings in the clamp bars being provided for the different height adjustments of the suspension members 30. The clamp members 60 and 62 of course can be clamped in any position longitudinally of the wall brackets 58 to accomodate the adjustment of the suspension members relative to the tracks 22.

In unloading a car, an automobile is first hoisted with a hoist to relieve the weight thereof from the suspension members. The thrust members 48 and 51 are then disconnected from the wall of the railway car after which the suspension members may be swung away from the wheels of the automobile with the thrust members 51 retained in folded position against the suspension member by the buttons 56 as shown in Figure 3.

After the upper automobiles are removed, the rope 68 can be manipulated for pulling the suspension members against the roof of the car as shown in Figure 4.

When decking an exceptionally long automobile the suspension members at the center of the car A are sometimes adjusted relative to the tracks 22 so that they are in front of the door opening of the car A.

The brackets 58 cannot extend over the door opening and I therefore provide an extension for the brackets consisting of a door bracket 84 and bar 86 which is slidably mounted with respect to the brackets 58. When the door 18 is moved to closed position, the bar 86 may be withdrawn from the brackets 58 and secured to the bracket 84 by a bolt or the like 88. A member 90 partially encircles the bar 86 and is provided with a plurality of openings 92 adapted to receive the bolt 64 of the thrust member 51. A set screw 94 may be provided for preventing sliding movement of the member 90 relative to the bar 86.

End members 96 and 98 are riveted to the brackets 58 and coact with an enlargement 100 of the bar 86 to prevent withdrawal of the bar from the brackets so that it will not be lost. The end member 98 is provided with a plurality of openings 102 to receive the bolt 64 of the thrust member 51 in the event that the position of the thrust member is in line with the end member 98.

In Figures 9 and 10 I have illustrated how the wheels of the automobile B may be removed and the suspension members 30 may coact with the axles of the automobile rather than with extension nuts 44 as shown in Figure 2. The opening 42 is too large for the axles and I therefore provide a keeper member 104 bolted by means of bolts 106 to the suspension members 30 to prevent undesired movement of the axle relative to the opening 42.

In Figure 12 I have shown how an automobile can be "half-decked." This arrangement may be used where the railway car A is long enough to permit "half-decking" of the two end cars as indicated at B' and the positioning of one or two additional cars on the floor as indicated at B''. When such an arrangement is used only two of the suspension means need be provided in the railway car.

Some changes may be made in the construction and arrangement of the parts of my device without departing from the real spirit and purpose of my invention, and it is my intention to cover by my claims, any modified forms of structure, or use of mechanical equivalents, which may be reasonably included within their scope.

I claim as my invention:

1. For use in a railway car or the like, decking of the character disclosed comprising suspension means hingedly supported with respect to said railway car, the means of support being arranged along the upper side corners of said car, said suspension means being capable of swinging movement to an inoperative position against the roof of said car, thrust members mounted on said suspension members and means for securing said thrust members to the side walls of said car.

2. For use in a railway car or the like, decking of the character disclosed comprising suspension means hingedly supported with respect to said railway car, the means of support being arranged along the upper side corners of said car, said suspension means being capable of swinging movement to an inoperative position against the roof of said car, thrust members mounted on said suspension members and means for securing said thrust members to the side walls of said car, said thrust members being adjustable as to length.

3. For use in a railway car or the like, decking of the character disclosed comprising suspension means hingedly supported with respect to said railway car, the means of support being arranged along the upper side corners of said car, said suspension means being capable of swinging movement to an inoperative position against the roof of said car, thrust members hingedly connected with said suspension members, means for securing the thrust members to the side walls of said car and means for securing them to the suspension members whereby they may also be swung to inoperative position against the roof of said car.

4. For use in a railway car or the like, decking of the character disclosed comprising suspension means hingedly supported with respect to said railway car, the means of support being arranged along the upper side corners of said car, said suspension means being capable of swinging movement to an inoperative position against the roof of said car, thrust members mounted on said suspension members and means for securing said thrust members to the side walls of said car, said last means comprising a wall bracket, a clamp member slidable thereon and a bolt for securing the thrust member to the clamp member and for clamping the clamp member to the bracket.

5. For use in a railway car or the like, decking of the character disclosed comprising suspension means hingedly supported with respect to said railway car, the means of support being arranged along the upper side corners of said car, said suspension means being capable of swinging movement to an inoperative position against the roof of said car, thrust members mounted on said suspension members and means for securing said thrust members to the side walls of said car, said last means comprising a wall bracket and bolt means for securing the thrust member in different positions thereon.

6. For use in a railway car or the like, decking of the character disclosed comprising suspension means hingedly supported with respect to said railway car, the means of support being arranged along the upper side corners of said car, said suspension means being capable of swinging movement to an inoperative position against the roof of said car, thrust members mounted on said suspension members and means for securing said thrust members to the side walls of said car, said last means comprising a wall bracket, a bar slidable relative thereto, a door bracket, means for securing said bar thereto and a clamp member carried by the bar.

7. For use in a railway car or the like, decking of the character disclosed comprising suspension means hingedly supported with respect to said railway car, the means of support being arranged along the upper side corners of said car, said suspension means being capable of swinging movement to an inoperative position against the roof of said car, thrust members mounted on said suspension members and means for securing said thrust members to the side walls of said car, said last means comprising a wall bracket, a bar slidable relative thereto, a door bracket, means for securing said bar thereto and a clamp member carried by the bar and slidable thereon and means for securing the thrust member thereto.

8. For use in a railway car or the like, decking of the character disclosed comprising track members arranged longitudinally relative to said car, suspension members depending therefrom and laterally swingable relative thereto for adjustment purposes and also for allowing swinging movement of the suspension members to inoperative position and thrust members for connecting the suspension members to the side walls of said car.

9. For use in a railway car or the like, decking of the character disclosed comprising track members arranged longitudinally relative to said car, suspension members depending therefrom and laterally swingable and longitudinally slidable relative thereto for adjustment purposes and also for allowing swinging movement of the suspension members to inoperative position and thrust members for connecting the suspension members to the side walls of said car.

10. For use in a railway car or the like, decking of the character disclosed comprising track members arranged longitudinally relative to said car, suspension members depending therefrom and laterally swingable relative thereto for adjustment purposes and also for allowing swinging movement of the suspension members to inoperative position and thrust members for connecting the suspension members to the side walls of said car, said suspension members being adjustable as to length.

11. For use in a railway car or the like, decking of the character disclosed comprising track members arranged longitudinally relative to said car, suspension members depending therefrom and laterally swingable relative thereto for adjustment purposes and also for allowing swinging movement of the suspension members to inoperative position and thrust members for connecting the suspension members to the side walls of said car, said suspension members being also to an out of the way position adjacent the side of said car.

12. For use in a railway car or the like, decking of the character disclosed comprising track members arranged longitudinally relative to said car, suspension members depending therefrom and laterally swingable relative thereto for adjustment purposes and also for allowing swinging movement of the suspension members to inoperative position and thrust members for connecting the suspension members to the side walls of said car, said suspension members being also to an out of the way position adjacent the side of said car, said thrust members being foldable to collapsed position relative to said suspension members to also be out of the way.

13. For use in a railway car or the like, decking of the character disclosed comprising track members arranged longitudinally relative to said car, suspension members depending therefrom and laterally swingable and longitudinally slidable relative thereto for adjustment purposes and also for allowing swinging movement of the suspension members to inoperative position and thrust members for connecting the suspension members to the side walls of said car and pin means for retaining said suspension members in predetermined positions relative to said tracks.

Des Moines, Iowa, August 30, 1930.

BERT A. MUSSELMAN.